United States Patent Office 3,199,744
Patented Aug. 10, 1965

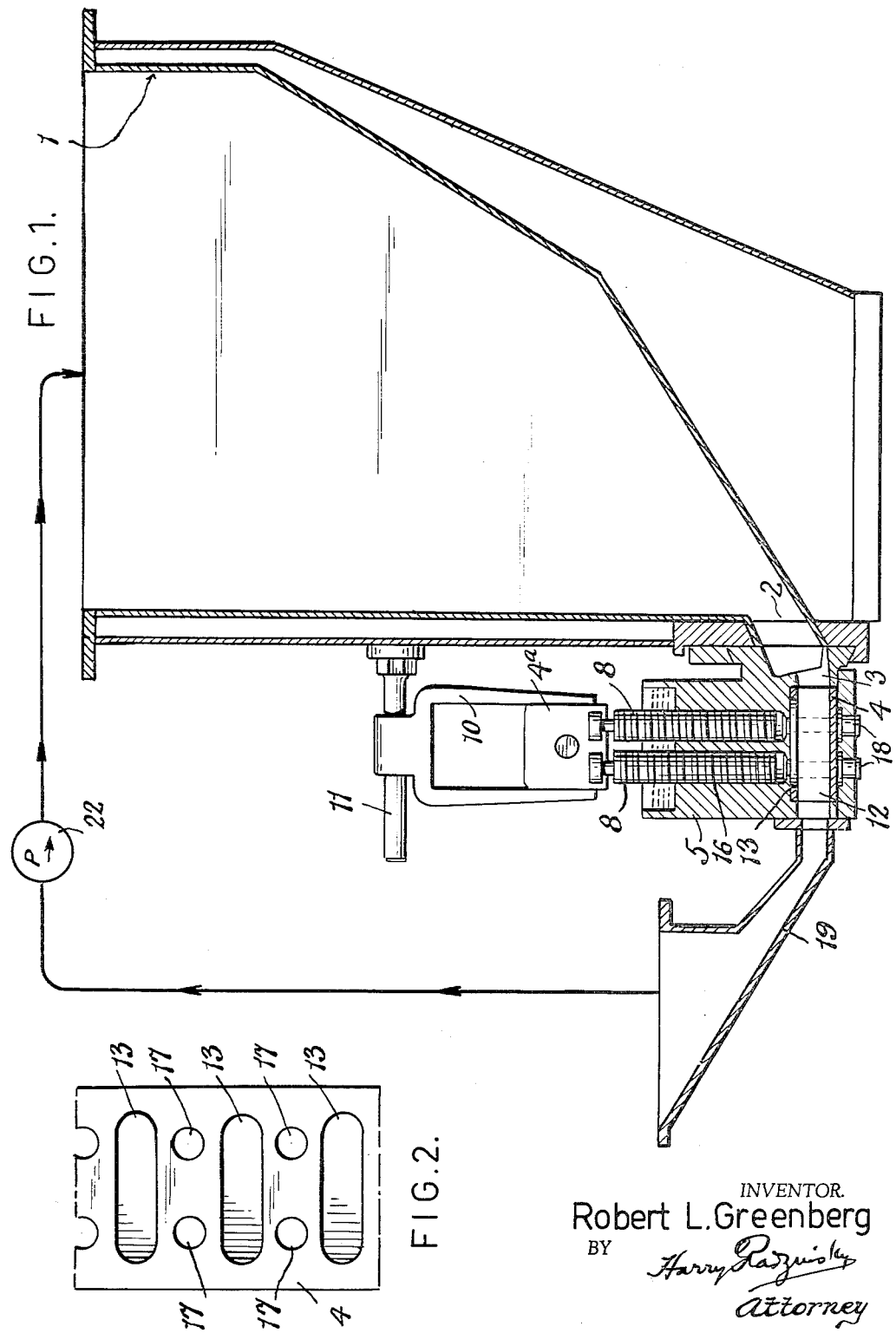

3,199,744
APPARATUS FOR FEEDING PORTIONS OF A MIXTURE OF A FLUID AND SOLID MATERIALS
Robert L. Greenberg, Englewood, N.J., assignor to National Equipment Corporation, New York, N.Y., a corporation of New York
Filed Apr. 9, 1963, Ser. No. 271,698
2 Claims. (Cl. 222—255)

This invention relates to feeding or depositing materials, such as, for example, materials which are composed of fluent substances mixed with solids. An example of such material might be a mixture of fluent chocolate, cream, caramel or other edible substance and a solid material such as nuts, raisins, fruits etc., such mixture being one used for confectionery production.

It is an object of the invention to provide an apparatus for feeding the product from a hopper or other source of supply, in required amounts to a point of formation or deposit, without causing the mixture to build up and clog the apparatus and without causing irregular dispersion of the solid ingredients in the fluent substance.

A difficulty encountered in handling such material as above described when it is for example, fed to a pump or other delivery means and delivered to a point of deposit, is the tendency of the solid material in the mixture to either float at the top of the fluid or else to build up in parts of the apparatus in such a manner as to either result in an irregular feed in the proper proportions of the solid and fluid, or else clog the pump or other parts or passages of the depositing apparatus.

It is highly desirable, in an arrangement of this kind, that the material delivered to the point of deposit, shall be thoroughly and uniformly mixed. That is to say, the solids should be in the required proportion to the fluid material in each predetermined amount dispensed by the depositing pump, and further, in the production of candies, it is desired that the solid material, such as nuts, raisins and the like, shall be covered by the chocolate, cream, caramel etc., and not exposed on the surface of the formed product. In other words, it is desirable that a completely uniform mixture shall be delivered by the pump or other delivery means.

This result can be secured if the material is kept in constant circulation while the pumping or other feeding means is in operation. With that in view, I utilize a main reservoir or hopper in which the mixture of fluid and solid material is contained and in one embodiment of the invention this mixture is fed through a slidable pump bar from the main hopper through a continuous passage, connected at one end to the main hopper and connected at the other end into a supplemental or auxiliary hopper. The material is caused to be in movement from the first hopper and into the auxiliary hopper from which it is caused to flow, by means of a pump or other suitable circulating device, back to the first hopper so that as a result there is a continuous circulating flow of the material, with draw-off means such as a pump operative on the moving material, and the material is thus not allowed to remain static. As a result, the solids do not tend to float to the top of the mixture, and therefore there is uniformity in the delivered or deposited product.

Moreover, since the possibility of clogging up the pump is eliminated, large pieces of the nuts or other solids can be used and this is highly desirable in candy production in order to preserve the texture of the solids and eliminating the necessity for grinding the solids into fine particles.

With these and other objects to be hereinafter set forth in view, I have devised the arrangement of parts to be described and more particularly pointed out in the claims appended hereto.

In the accompanying drawings, wherein an illustrative embodiment of the invention is disclosed.

FIG. 1 is a view, partly in diagrammatic form, of an apparatus for carrying out the invention, and FIG. 2 is a face view of a portion of the cut-off bar.

In effecting the improvement, an apparatus such as diagrammatically shown in FIG. 1 of the drawing, may be employed. This is illustrative of one satisfactory arrangement, but other means can undoubtedly be employed. In the drawing, 1 indicates a main hopper or reservoir, in which a supply of the material, composed of a mixture of a fluent substance, such as for example, chocolate, cream, caramel etc. and a solid material such as nuts, raisins, or the like.

At its lower end, the hopper is provided with an outlet 2 leading into a passage 3 through a pump housing 5 and in which a cut-off bar is slidably movable. Such cut-off bar is a part of a pump construction of a known type, examples of somewhat similar pumps being shown in patents to Perkins, Nos. 2,510,317, 2,597,175 and 2,764,322. Other types of pump or other suitable feed or delivery means can be used. Such a pump includes a plurality of pistons 8, slidably operative in cylinders 16, and attached to a cross-head 4a and vertically reciprocated in a guide member 10, mounted on a stud 11 projecting from a wall of the hopper 1. The cut-off bar 4, which is horizontally reciprocated by suitable means, is provided with transverse passages 12 which are registered with the passage 3 in the pump housing. The passages 12 in the cut-off bar have a substantially large top opening 13 through which the material is drawn upwardly on rising movement of the pistons 8, to thereby draw charges of the material up into the cylinders 16. Then, when the pump bar is longitudinally shifted, it will align openings 17 extending through it, and located between the openings 13, with the lower ends of the cylinders 16 and upon the descent of the pistons 8, the material will be ejected out of the cylinders 16 and forced down through outlets of nozzles 18 into suitable molds, receptacles or belts or other surfaces to produce the candies or confections. It will be noted that the openings 13 are relatively large as compared to the cylinder inlets so that a build-up of the material around or within the openings 13 will not be likely.

At the end of the passage 3 remote from its inlet 2, is connected a supplemental or auxiliary hopper 19. A circulating device, which can consist of a pump 22 or other suitable circulating or material-conveying means, is suitably located to circulate the material from the auxiliary hopper 19 to the main hopper 1.

In effecting the improvement, the product, consisting of a mixture of the solid and fluent material, is placed in the main hopper 1 and while the pump 5 is set in operation as well as the circulating device 22, the material will be circulated from the hopper 1 and moved through the passage 3, through passages 12 and into the auxiliary hopper 19 and from there back into the main hopper 1. While the material is in such movement, the cut-off bar 4 will alternately register its openings 13 with the ends of the cylinders 16 during which time the ascending movement of the pistons 8 will draw charges of the material up into the cylinders, this being done while the mixture is in movement through the passages 12 between the two hoppers 1 and 19.

Since the total area of all of the passages is relatively small in relation to the amount of material in the hopper 1, the flow through passage 12 is somewhat restricted. The material in hopper 1 and hopper 19 will not necessarily attain the same height by a natural gravity flow. However, when the pump 5 operates, the upward movement of the pistons 8 produces a suction which creates a flow of material through the passage 2 into the passages 3 and 12. The continued cycling of pump 5 has the effect of pumping the material from the hopper 1 into the hopper 2.

The cut-off bar is slidably shifted to align its holes 17 with the lower ends of the cylinders 16 so that upon the descent of the pistons 8 the material then in the cylinders will be discharged out of the same through the holes 17 and the aligned nipples or nozzles 18 and into molds, receptacles, on a belt or elsewhere as required.

While I have herein described the improved apparatus as being especially applicable for use in confectionery production, it will be apparent that the same may be used wherever it is found desirable or necessary to secure a complete and uniform mixture of solids and fluids and where non-clogging of the apparatus used in the method is required.

Having thus described a single embodiment of the invention, it is obvious that the same is not to be restricted thereto, but is broad enough to cover all structures coming within the scope of the annexed claims.

What I claim is:

1. An apparatus for drawing-off predetermined amounts of a mixture of a fluid and solid material comprising, a hopper constituting a source of supply for the mixture, an auxiliary hopper, a passage extending between the hoppers, a pump including a cut-off member operative in the passage, said pump having piston means co-operating with the cut-off member in drawing off portions of the mixture out of the passage while the material is flowing therethrough from one of the hoppers to the other hopper and while the cut-off member is in a certain position, and forcing said material out of the passage while the cut-off member is in another position, and circulating means for drawing the material from the auxiliary hopper and returning it to the supply hopper.

2. An apparatus for drawing off predetermined amounts of a mixture of a fluid and solid material comprising, a supply hopper for the mixture, an auxiliary hopper, a passage extending between the hoppers, a piston type pump having a piston operative to dispense predetermined amounts of the mixture while the mixture is in movement through the passage, said pump including a sliding apertured cut-off bar operative to permit the piston to first draw up and then dispense the predetermined amounts of the mixture, the passage having outlets uncovered by the cut-off bar during the dispensing of the material, and circulating means for drawing the material out of the supply hopper, moving it through the passage and into the auxiliary hopper and returning it to the supply hopper.

References Cited by the Examiner

UNITED STATES PATENTS

| | | | |
|---|---|---|---|
| 2,325,931 | 8/43 | Avigdor | 222—255 X |
| 2,461,766 | 2/49 | Peeps | 222—318 X |
| 2,510,317 | 6/50 | Perkins | 222—255 |
| 2,791,975 | 5/57 | Mendoza | 107—14 |
| 2,877,929 | 3/59 | Ireland | 222—318 X |

LOUIS J. DEMBO, *Primary Examiner.*

RAPHAEL M. LUPO, *Examiner.*